United States Patent
Taoka

(10) Patent No.: US 8,031,245 B2
(45) Date of Patent: Oct. 4, 2011

(54) IMAGING APPARATUS AND METHODS, AND STORING MEDIUM HAVING COMPUTER PROGRAM TO PERFORM THE METHODS

(75) Inventor: Mineki Taoka, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 478 days.

(21) Appl. No.: 12/330,601

(22) Filed: Dec. 9, 2008

(65) Prior Publication Data

US 2009/0167916 A1  Jul. 2, 2009

(30) Foreign Application Priority Data

Dec. 26, 2007 (JP) ................................. 2007-335256

(51) Int. Cl.
*H04N 3/14* (2006.01)
(52) U.S. Cl. .................................................... 348/294
(58) Field of Classification Search ................ 348/294
See application file for complete search history.

(56) References Cited

U.S. PATENT DOCUMENTS

| | | | | |
|---|---|---|---|---|
| 4,547,807 A | * | 10/1985 | Mitani et al. | 348/249 |
| 4,819,075 A | * | 4/1989 | Imaide et al. | 348/297 |
| 5,089,894 A | * | 2/1992 | Higashitsutsumi | 348/249 |
| 5,444,483 A | * | 8/1995 | Maeda | 348/231.6 |
| 2006/0232692 A1 | * | 10/2006 | Takane | 348/248 |
| 2009/0073277 A1 | * | 3/2009 | Numata et al. | 348/222.1 |

FOREIGN PATENT DOCUMENTS

| | | |
|---|---|---|
| JP | 2004-297653 A | 10/2004 |
| JP | 2004-312072 A | 11/2004 |

* cited by examiner

*Primary Examiner* — James Hannett
(74) *Attorney, Agent, or Firm* — Drinker Biddle & Reath LLP

(57) ABSTRACT

An imaging apparatus and method using a line memory controller for writing first image region data of an amount less than the total storage capacity of a line memory among image data output on a line-by-line basis from an imaging device, to the line memory and reading the first image region data from the line memory, an SDRAM controller for writing a second image region data besides the first image region data among image data output from the imaging device on a line-by-line basis to a storage medium and reading the second image region data from that storage medium after image data output from the imaging device is ended, and a line memory controller for writing the second image region data read from the storage medium to the line memory. Thus, the size of and power consumption by the storage medium can be reduced.

18 Claims, 5 Drawing Sheets

IMAGING APPARATUS AND METHODS, AND STORING MEDIUM HAVING COMPUTER PROGRAM TO PERFORM THE METHODS

CROSS-REFERENCE TO RELATED PATENT APPLICATION

This application claims the benefit of Japanese Patent Application No. 2007-335256, filed on Dec. 26, 2007 in the Japanese Intellectual Property Office, the entire content of which is incorporated herein by reference.

BACKGROUND OF THE INVENTION

1. Field of the Invention

The present invention relates to an imaging apparatus and method, and a storage medium having embodied thereon a computer program for executing the imaging method.

2. Description of the Related Art

Imaging devices (image sensors), such as charge coupled devices (CCD) or complementary metal oxide semiconductors (CMOS), which are provided in imaging apparatus such as camcorder or digital still camera, have become capable of realizing high resolution of six million pixels or more, and furthermore, now have high speed reading capabilities of 60 frames or more per second. To process image data output from an imaging device at high speed, a pipe line processing method has been used. Meanwhile, in a high resolution imaging device, the number of pixels per line is steadily increasing, and thus the capacity of line memories has become enlarged, and the size of circuits included in an imaging apparatus has also become enlarged.

Japanese Patent Laid-Open Gazette No. 2004-312072 discloses a method of reducing the size of an image processing circuit by sharing a memory, instead of including a plurality of memories corresponding to a multiple number of image processing operations. Also, as described in Japanese Patent Laid-Open Gazette No. 2004-297653, a method of reducing the capacity of a memory by storing data that is compressed and encoded, instead of storing non-compressed and large capacity image data output from an imaging device, wherein the compressed and encoded image data is decoded just before interpolation.

However, even when a memory is shared or image data is compressed and encoded as described in Japanese Patent Laid-Open Gazette No. 2004-312072 or 2004-297653, when image data output from an imaging device, that is, RAW data, is being processed, the image data is usually being written to a storage medium like a synchronous dynamic random access memory (SDRAM) which is outside of an image processing circuit. Accordingly, when writing the image data output by the imaging device with high resolution and high speed output, to the SDRAM at high speed, power consumption is increased.

SUMMARY OF THE INVENTION

The present invention provides an imaging apparatus and method, and a storage medium having thereon embodied a computer program for executing the method. The apparatus and method are capable of reducing the capacity of a storage medium to which image data is stored prior to image signal processing, and the power consumption due to writing and reading the image data to and from the storage medium.

Accordingly, an embodiment of the present invention provides an imaging method comprising: (a) writing first image region data of an amount less than the total storage capacity of a line memory among image data output on a line-by-line basis from an imaging device, to the line memory, (b) reading the first image region data from the line memory in which the first image region data is stored, (c) writing second image region data besides the first image region data among image data output on a line-by-line basis from the imaging device, to a storage medium, (d) reading the second image region data from the storage medium in which the second image region data is stored, after the output of image data from the imaging device is complete, and (e) writing the second image region data read from the storage medium to the line memory. The method may further comprise performing an image signal process with respect to the first image region data read from the line memory after step (b); (f) reading the second image region data from the line memory in which the second image region data is stored after step (e); and processing the second image region data output from the line memory after step (f).

Another embodiment of the present invention provides an imaging apparatus comprising a first image region data writing unit for writing first image region data of an amount less than the total storage capacity of a line memory among image data output on a line-by-line basis from an imaging device, to the line memory, a first image region data reading unit for reading the first image region data from the line memory in which the first image region data is stored, a second image region data writing unit for writing a second image region data besides the first image region data among image data output on a line-by-line basis from the imaging device, to a storage medium, a second image region data reading unit for reading the second image region data from the storage medium in which the second image region data is stored, after the output of image data from the imaging device is complete, and a third image data writing unit for writing the second image region data read from the storage medium to the line memory.

A further embodiment of the present invention provides a storage medium having embodied thereon a computer program for executing an imaging method. The method comprises writing first image region data of an amount less than the total storage capacity of a line memory among image data output on a line-by-line basis from an imaging device, to the line memory, reading the first image region data from the line memory in which the first image region data is stored, writing second image region data besides the first image region data among image data output on a line-by-line basis from the imaging device, to a storage medium, reading the second image region data from the storage medium in which the second image region data is stored, after the output of image data from the imaging device is complete, and writing the second image region data read from the storage medium to the line memory.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Figure 1:
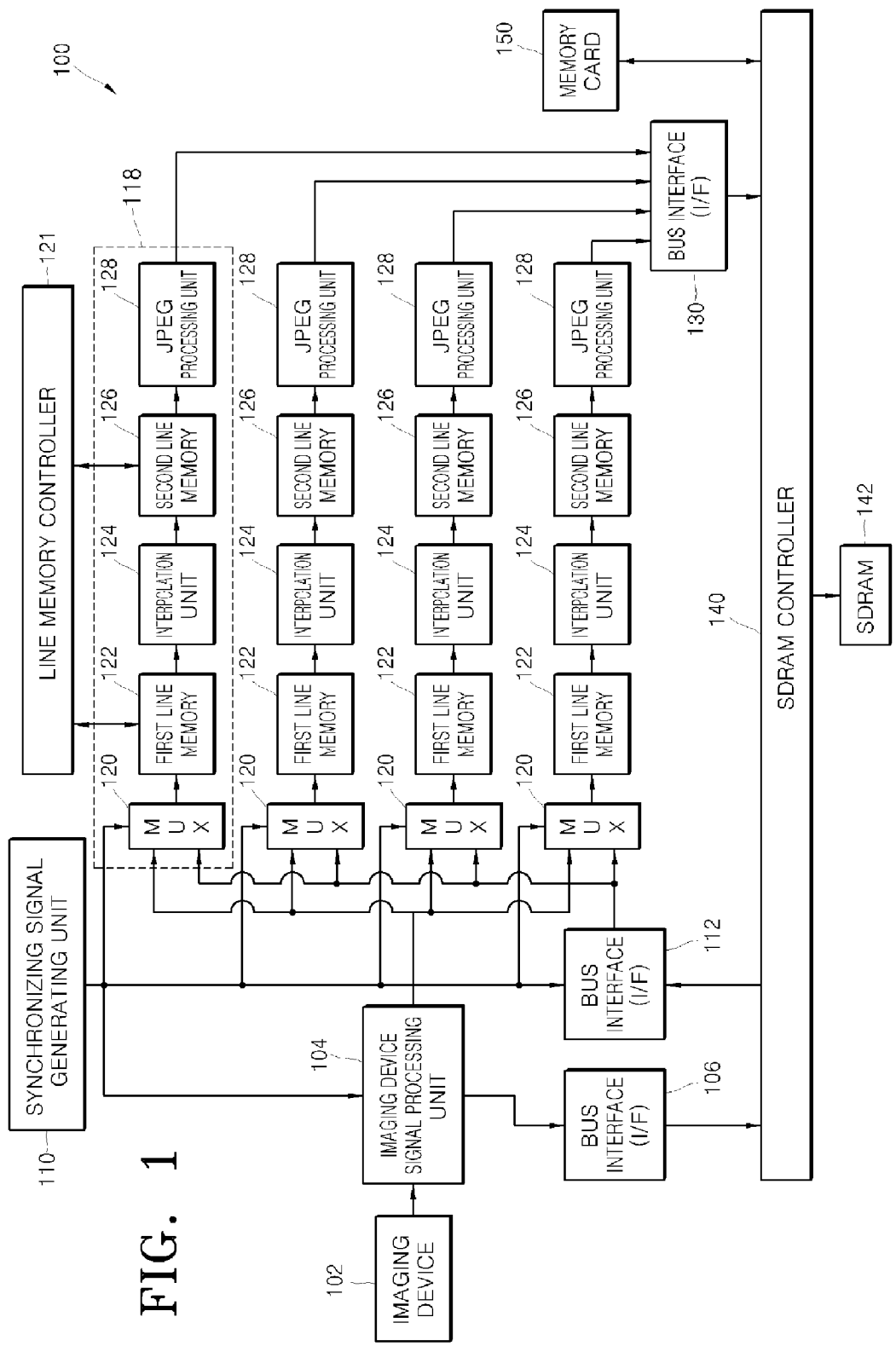
FIG. 1 is a block diagram illustrating an example of an imaging apparatus according to an embodiment of the present invention.

Exemplary embodiments of the present invention will now be described more fully with reference to the accompanying drawings. In the detailed description and the drawings, like reference numerals denote like elements having substantially the same function, and thus repeated description will be omitted.

In addition, in the following description, the terms image processing, first image region, second image region, image data, and so forth carry the same meaning as picture processing, the first picture region, the second picture region, picture data, and so forth. Also, image signal processing may also be referred as development processing.

As will also be appreciated from the following, according to the embodiments of the present invention described herein, the size of the storage medium in which image data is stored before image signal processing can be reduced, and the power consumption related with writing and reading data in the storage medium can be reduced.

FIG. 1 is a block diagram illustrating an example of an imaging apparatus 100 according to an embodiment of the present invention. The imaging apparatus 100 may be a camcorder or a digital still camera which can process image data output from an imaging device 102 and thus write moving or still images. As illustrated in FIG. 1, the imaging apparatus 100 may include an imaging device 102, an imaging device signal processing unit 104, bus interfaces (I/F) 106, 112, and 130, a synchronizing signal generating unit 110, a plurality of multiplexers (MUX) 120, a line memory controller 121, a plurality of first line memories 122, a plurality of interpolation units 124, a plurality of second line memories 126, a plurality of JPEG processing units 128, a synchronous dynamic random access memory (SDRAM) controller 140, a SDRAM 142, and a memory card 150.

The imaging device 102 in this example is an image sensor such as a charge coupled device (CCD), a complementary metal oxide semiconductor (CMOS), or the like, which receives light from a subject, convert it into electrical signals and transmits image data in units of frames to the imaging device signal processing unit 104. The imaging device signal processing unit 104 receives image data transmitted from the imaging device 102. The imaging device signal processing unit 104 includes an analog-digital (AD) converter converting an input analog signal to a digital signal. The imaging device signal processing unit 104 transmits image data of a digital signal to the MUX 120, and transmits a portion of image data to the SDRAM 142 through the bus interface (I/F) 106 and the SDRAM controller 140.

The synchronizing signal generating unit 110 generates a synchronizing signal and transmits the synchronizing signal to the imaging device signal processing unit 104, the bus interface (I/F) 112, and the MUX 120. The imaging device signal processing unit 104 transmits image data to the MUX 120 or to the bus interface (I/F) 112 based on the synchronizing signal. Also, the bus interface (I/F) 112 transmits a signal to the SDRAM controller 140 so as to read image data that is temporarily stored in the SDRAM 142, based on the synchronizing signal. The MUX 120 receives image data from the imaging device signal processing unit 104 or receives image data from the SDRAM 142, based on the synchronizing signal.

The MUX 120, the first line memory 122, the interpolation unit 124, the second line memory 126, and the JPEG processing unit 128 are together called an image signal processing unit 118 which performs image signal processing with respect to the image data, for example, RAW data, output from the imaging device 102. Image signal processing means, for example, interpolating, compressing and encoding the RAW data. However, image signal processing is not limited thereto but may include other processing operations. Also, the image signal processing unit 118 is formed of a plurality of paths, thereby allowing for efficient performing of image signal processing. According to this embodiment of the present invention, the image signal processing unit 118 is formed having four paths as illustrated in FIG. 1.

Figure 3:
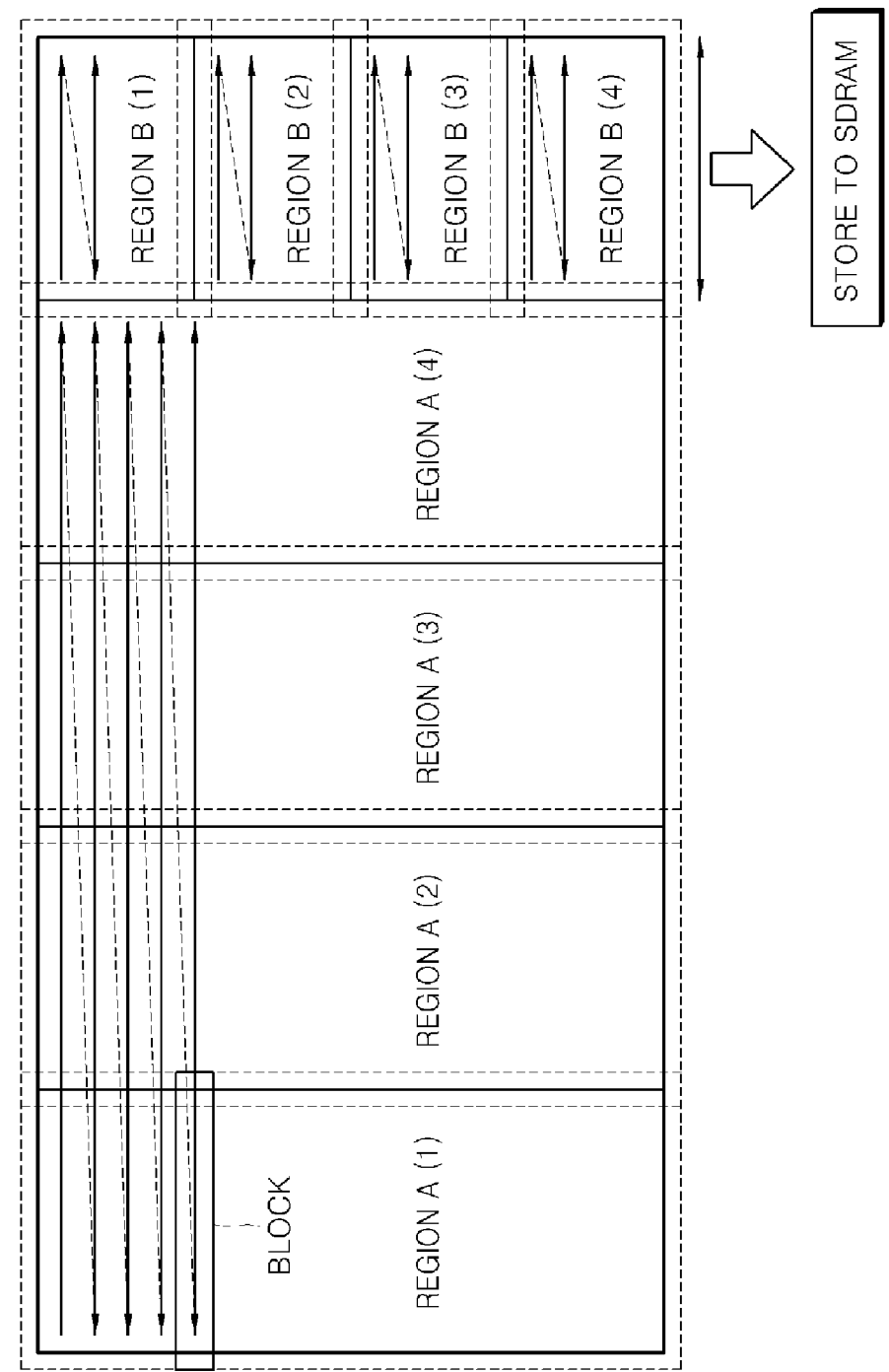
FIG. 3 illustrates an example of an imaging plane of the imaging device in the imaging apparatus of FIG. 1.
Figure 4:
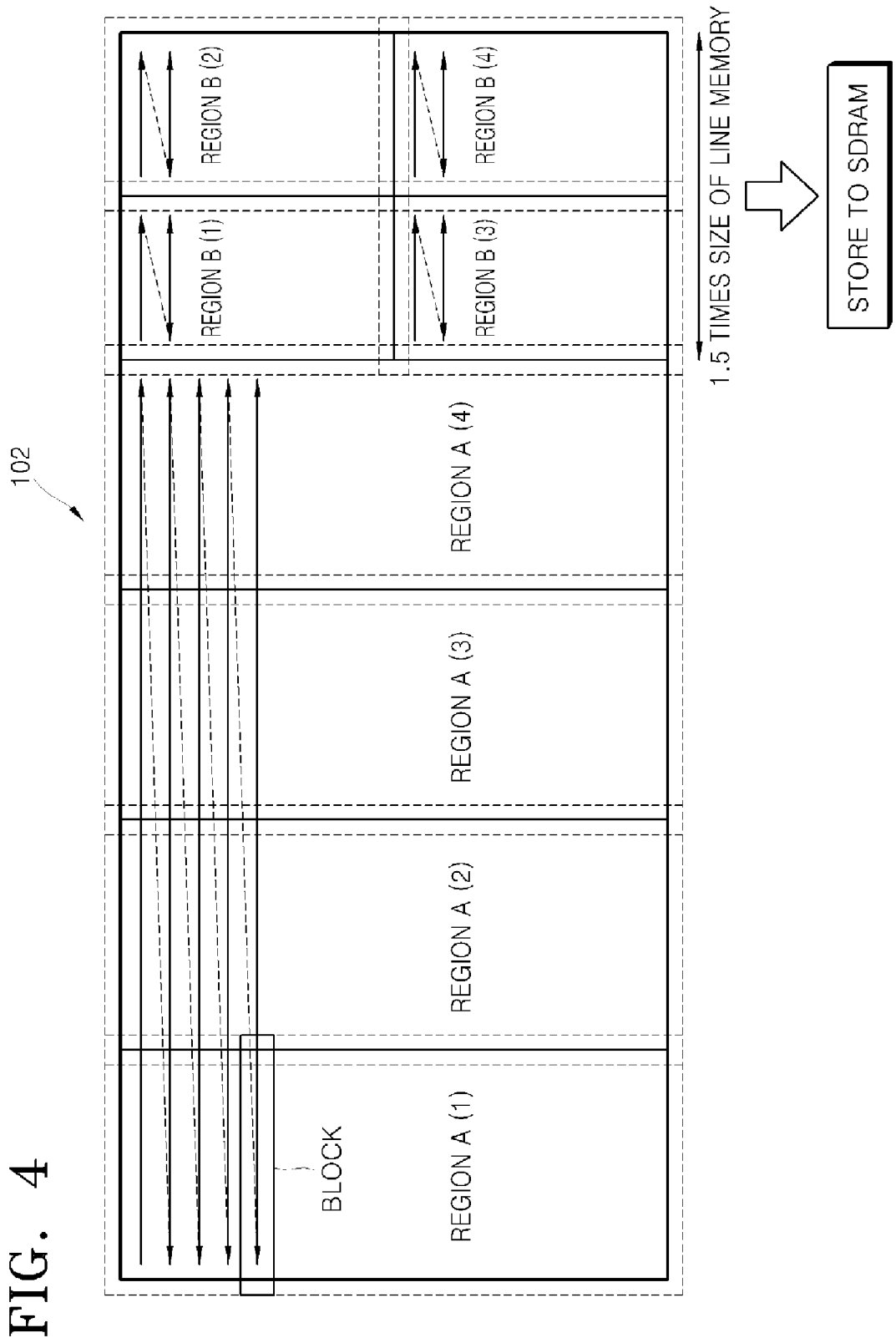
FIG. 4 illustrates an example of another imaging plane of the imaging device in the imaging apparatus of FIG. 1.
Figure 5:
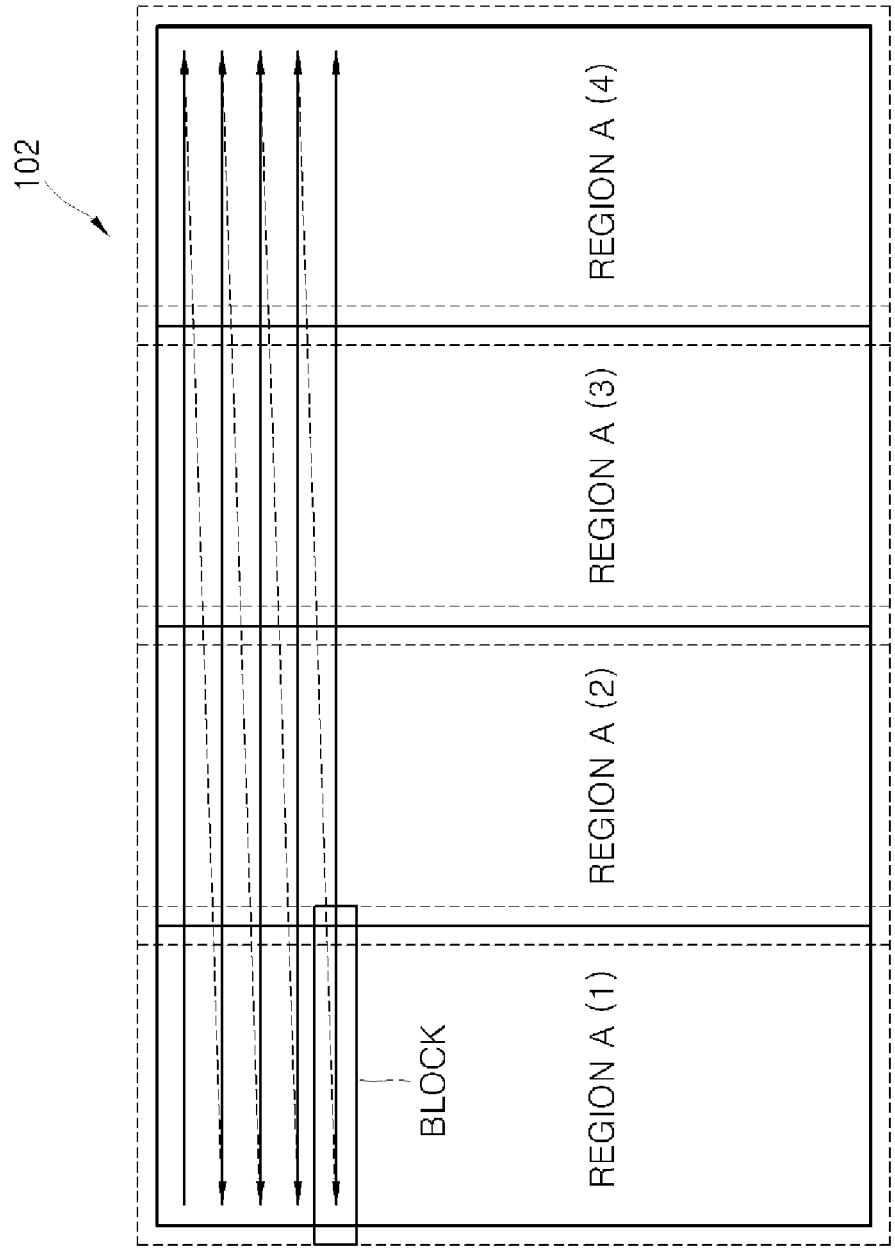
FIG. 5 illustrates an example of another imaging plane of the imaging device in the imaging apparatus of FIG. 1.

According to this embodiment of the present invention, as illustrated in FIG. 3 through FIG. 5, image data output from the imaging device 102 is divided into a plurality of regions, and each region is processed in its respective image signal processing unit 118. That is, FIG. 3 through FIG. 5 illustrate an imaging plane of the imaging device according to this embodiment and represent a plurality of regions that image signal processing is performed. A region surrounded by a solid line in FIGS. 3 through 5 is the range of image data output from the imaging device 102, and each of the plurality of regions REGION A(1), REGION A(2), etc. surrounded by a dashed line is the range of image data being processed by each of the image signal processing units 118. For example, one path of the four in the image signal processing unit 118 processes image data of the region A(1), and another path of the image signal processing unit 118 processes image data of the region A(2). Also, image data output from the imaging device 102 is divided into a plurality of horizontal lines, and each horizontal line is divided into a plurality of blocks.

In addition, for interpolation, a portion of image data of another region is needed to interlink images. Thus, the regions indicated by dashed lines have portions that overlap one another.

The MUX 120 is a multiplexer included in each path of the image signal processing unit 118. The MUX 120 receives image data (first image region data) transmitted from the imaging device signal processing unit 104 and image data (second image region data) transmitted through the bus interface (I/F) 106, the SDRAM controller 140, the SDRAM 142, and the bus interface (I/F) 112, which is transmitted from the imaging device signal processing unit 104, to transmit the image data to the first line memory 122.

The first line memory 122 is included in each image signal processing unit 118. The first line memory 122 has a capacity capable of storing at least one block of image data. The first line memory 122 receives one block of image data from the MUX 120, stores the corresponding image data temporarily, and transmits the image data to the interpolation unit 124.

The interpolation unit 124 is included in each path of the image signal processing unit 118. The interpolation unit 124 interpolates image data, for example, RAW data, output from the imaging device 102. The interpolation unit 124 receives image data from the first line memory 122 to interpolate, and transmits the interpolated image data to the second line memory 126.

The second line memory 126 is included in each path of the image signal processing unit 118. The second line memory 126 has a capacity capable of storing at least one block of interpolated image data. The second line memory 126 receives one block of interpolated image data from the interpolation unit 124, stores the corresponding interpolated image data temporarily, and transmits it to the JPEG processing unit 128.

The JPEG processing unit 128 is included in each path of the image signal processing unit 118. The JPEG processing unit 128 compresses and encodes the image data interpolated in the interpolation unit 124. The JPEG processing unit 128 receives the interpolated image data from the second line memory 126, compresses and encodes the interpolated image data, and transmits the JPEG-processed image data to the SDRAM 142 through the bus interface (I/F) 130 and the SDRAM controller 140. The method of compressing and encoding is not limited to the JPEG method, and other methods may also be applied.

The line memory controller 121 controls writing and reading of data in the first line memory 122 and the second line memory 126. The line memory controller 121 is an embodiment of a first image region data writing unit and writes image data of an amount less than the total storage capacity of a line memory (first image region data) among image data output from the imaging device 102, to the first line memory 122. Also, the line memory controller 121 is an embodiment of a first image region data reading unit, reading the first image region data. In addition, the line memory controller 121 writes interpolated image data to the second line memory 126 or reads the interpolated image data from the second line memory 126. Also, the line memory controller 121 is an embodiment of a third image data writing unit, writing second image region data besides the first image region data among image data output from the imaging device 102, to the SDRAM 142.

The SDRAM controller 140 controls writing and reading of data in the SDRAM 142. The SDRAM controller 140 is an embodiment of a second image region data writing unit and writes second image region data besides the first image region data among image data output from the imaging device 102, to the SDRAM 142. Also, the SDRAM controller 140 is an embodiment of a second image region data reading unit, which reads the second image region data after the first image region data is read from the first line memory 122. Furthermore, the SDRAM controller 140 writes JPEG-processed data to the SDRAM 142. Also, the SDRAM controller 140 transmits the JPEG-processed data that is temporarily stored in the SDRAM 142 to the memory card 150.

The SDRAM 142 is an example of a storage medium, which temporarily stores image data output from the imaging device 102 or the JPEG-processed data. The memory card 150 is a storage medium such as a flash memory, a hard disk, and so forth, and receives the JPEG-processed data from the SDRAM 142 and stores it. Also, the memory card 150 is connected to the SDRAM controller 140 through a memory card interface (I/F) (not shown). The bus interfaces (I/F) 106, 112, and 130 connect the SDRAM 140 to the imaging device signal processing unit 104 and the image signal processing unit 118. Also, a series of processes in the imaging apparatus 100 may be performed by employing hardware or software.

Figure 2:
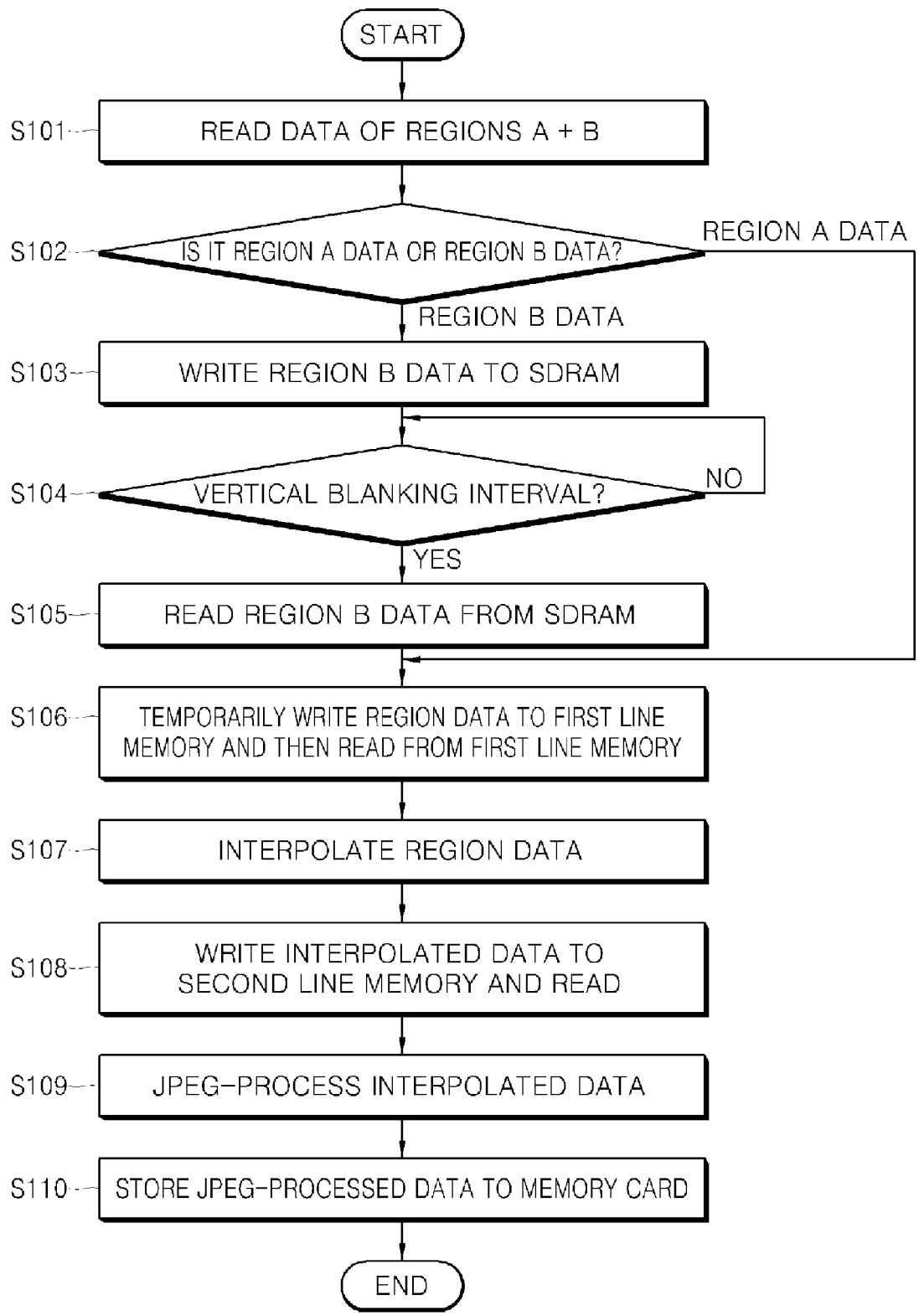
FIG. 2 is a flowchart illustrating an example of data processing in the imaging apparatus of FIG. 1.

Hereinafter, an example of the operation of the imaging apparatus 100 according to an embodiment of the present invention will be described with reference to FIGS. 2 through 5. FIG. 2 is a flowchart illustrating data processing of the imaging apparatus 100.

In this embodiment of the present invention, image data (first image region data), which can be stored by the total storage capacity of the first line memories 122 (in this case, four paths of the first line memory 122) or by the total storage capacity of the second line memories 126 (in this case, four paths of the second line memory 126), is not temporarily stored to the SDRAM 142, but is immediately transmitted from the imaging device 102 to the image signal processing unit 118, thereby being interpolated or compressed and encoded. Meanwhile, image data (second image region data) having an amount exceeding the total storage capacity of the first line memories 122 or the total storage capacity of the second line memories 126 is not processed immediately. Instead, the image data is temporarily stored in the SDRAM 142, and when the image signal processing of the first image region data is finished, if the image data is moving image data, it is processed during a vertical blanking interval, and if the image data is still image data, it is processed, for example, in a photographing period.

As illustrated in FIGS. 3 through 5, a region A refers to the range of image data that can be stored by the total storage capacity of the first line memories 122 or by the total storage capacity of the second line memories 126, among image data output from the imaging device 102. A region B refers to the range of image data, the amount of which exceeds the total storage capacity of the first line memories 122 or the total storage capacity of the second line memories 126.

First, image data is read from the imaging device 102 to the imaging device signal processing unit 104 in operation S101. Here, the image data of the imaging device 102, that is, regions A and B, is read. Then, data processing is performed according to whether the read image data is a region A or a region B in operation S102.

When the image data is of the region A (first image region data), the image data of the region A is written to the first line memory 122 to be temporarily stored, and then the image data is read from the first line memory 122 in operation S106. The read image data is interpolated in the interpolation unit 124 in operation S107. Then the interpolated image data is written to the second line memory 126 to be temporarily stored, and then the interpolated image data is read from the second line memory 126 in operation S108. Then the read interpolated image data is JPEG-processed in the JPEG processing unit 128 in operation S109. Then the JPEG-processed data is stored in the memory card 150 via the SDRAM 142 in operation S110.

Meanwhile, when image data is of the region B (second image region data), the image data of the region B is written to the SDRAM 142 in operation S103. When the image data is moving image data, it is stored until a vertical blanking interval in operation S104. During the vertical blanking interval, the image signal processing of the image data in the region A is complete, and thus the image data of the region B is read from the SDRAM 142 in operation S105 and the image data of the region B is processed during this interval in operations S106 through S109. Operations S106 through S109 are the same as those in the image signal processing of the image data of the region A, and thus description thereof will not be repeated. Then the JPEG-processed image data is stored in the memory card 150 through the SDRAM 142 in operation S110.

Next, an example of division of image data and an example of data processing of the divided regions of the image data will be described with reference to FIGS. 3 through 5.

In FIG. 3, the imaging device 102 is divided into five equal sized portions. Four of the five portions are a region A, and one of the five is a region B. The region A is itself divided into four regions A(1), A(2), A(3), and A(4) in a horizontal direction, and the region B is itself divided into four regions B(1), B(2), B(3), and B(4) in a vertical direction. The widths of the regions A(1), A(2), A(3), and A(4) and the regions B(1), B(2), B(3), and B(4) are the same. The storage capacity of one first line memory 122 or that of one second line memory 126 is determined by one block of image data.

Thus, by dividing the imaging device 105, the image data of the region A is processed as four paths of each horizontal line (block) in parallel, and then after the image data of the region A is processed, the image data of the region B is processed in four parallel paths.

Meanwhile, as illustrated in FIG. 4, the width of the region B may not be the same as the widths of the regions A(1), A(2), A(3), and A(4). For example, the storage capacity of one first line memory 122 or one second line memory 126 is determined by image data in one block of the region A. Here, the width of the region B may be greater than the width of one block of the region A. The region B is, as illustrated in FIG. 4, divided into two vertically, and into two horizontally, thus divided into four, in total.

In FIG. 5, image data is all contained in a region A only, and the region A is itself divided into a region A(1), a region A(2), a region A(3), and a region A(4) in a horizontal direction. In this case, image data output from the imaging device 102 can be processed as four paths of each horizontal line (block) in parallel, and then the whole image signal processing is finished. According to this embodiment of the present invention, since image signal processing is performed without writing or reading image data to/from the SDRAM 142, data can be processed quickly, and power consumption can also be reduced.

According to this embodiment of the present invention, by calculating the capacity of a line memory with which immediate image signal processing can be performed, and installing the line memory, image signal processing can be immediately performed with respect to the region A, with respect to the region B, image data can be temporarily stored in the SDRAM 142, and image signal processing on the image data of region B can be performed later. Accordingly, compared to the conventional art in which the whole image data is stored in the SDRAM 142, a region to be stored in the SDRAM 142 can be defined as a region that cannot be processed immediately, and thus the amount of data to be processed can be reduced, and the power consumption in the connection part between the imaging apparatus 100 and the SDRAM 142 can be reduced. Also, even when the imaging device 102 is of high resolution, data to be immediately processed and data to be processed later on at a better time are divided, thereby maintaining the processing speed.

Also, as described above, in the imaging device 102, image data of same horizontal line is divided into equivalent horizontal blocks and is processed in a parallel fashion in the image signal processing units 118 of the plurality of paths. Accordingly, in the JPEG method in which compression and encoding are performed with reference to blocks on the left side, there are blocks that cannot be referenced within this embodiment of the present invention. Thus, when compressing and encoding image data using a JPEG method in the present invention, in order to release the reference relationship first, a RST (restart marker code) is inserted into the compressed data in each block. In addition, in the JPEG method, in order to insert RST, the number of pixels being processed of each block should be the same, and the RST needs to be necessarily inserted into each of all the blocks. Thus, image data may preferably be divided into equal intervals both in the region A where an image signal process is performed immediately in the divided region A(1), and so forth, and in the region B where image data is temporarily stored in the SDRAM 142 and then processed later, as illustrated in FIG. 3.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An imaging method comprising:
   (a) writing first image region data of an amount less than the total storage capacity of a line memory among image data output on a line-by-line basis from an imaging device, to the line memory;
   (b) reading the first image region data from the line memory in which the first image region data is stored;
   (c) writing second image region data besides the first image region data among image data output on a line-by-line basis from the imaging device, to a storage medium;
   (d) reading the second image region data from the storage medium in which the second image region data is stored, after the output of image data from the imaging device is complete; and
   (e) writing the second image region data read from the storage medium to the line memory.

2. The method of claim 1, further comprising:
   performing an image signal process with respect to the first image region data read from the line memory after step (b);
   (f) reading the second image region data from the line memory in which the second image region data is stored after step (e); and
   performing the image signal process with respect to the second image region data read from the line memory after step (f).

3. The method of claim 2, wherein:
   the image signal process includes interpolating the first image region data or the second image region data.

4. The method of claim 1, further comprising:
   after step (b), interpolating the first image region data, processing the interpolated first image region data, and storing the processed first image region data in a memory.

5. The method of claim 1, further comprising:
   after step (e), reading the second image region data from the line memory, interpolating the second image region data, processing the interpolated second image region data, and storing the processed second image region data in a memory.

6. The method of claim 1, wherein:
   the first image region data is transmitted from an imaging device signal processing unit and the second image region data is transmitted through a bus interface.

7. An imaging apparatus comprising:
   a first image region data writing unit which writes first image region data of an amount less than the total storage capacity of a line memory among image data output on a line-by-line basis from an imaging device, to the line memory;
   a first image region data reading unit which reads the first image region data from the line memory in which the first image region data is stored;
   a second image region data writing unit which writes a second image region data besides the first image region data among image data output on a line-by-line basis from the imaging device, to a storage medium;
   a second image region data reading unit which reads the second image region data from the storage medium in which the second image region data is stored, after the output of image data from the imaging device is complete; and a third image data writing unit which writes the second image region data read from the storage medium to the line memory.

8. The imaging apparatus of claim 7, further comprising:
a first processor which performs an image signal process with respect to the first image region data read from the line memory after the first image region data is read from the line memory;
a third image data reading unit which reads the second image region data from the line memory in which the second image region data is stored; and
a second processor which performs the image signal process with respect to the second image region data read from the line memory.

9. The imaging apparatus of claim 8, wherein:
the image signal process includes interpolating the first image region data or the second image region data.

10. The imaging apparatus of claim 7, further comprising:
an interpolator which interpolates the first image region data read from the line memory, a processor which processes the interpolated first image region data, and a memory which stores the processed first image region data.

11. The imaging apparatus of claim 7, further comprising:
a third image data reading unit which reads the second image region data from the line memory, an interpolator that interpolates the second image region data, a processor which processes the interpolated second image region data, and a memory which stores the processed second image region data.

12. The imaging apparatus of claim 7, wherein:
the first image region data is transmitted from an imaging device signal processing unit and the second image region data is transmitted through a bus interface.

13. A storage medium having embodied thereon a computer program for executing an imaging method, the method comprising:
writing first image region data of an amount less than the total storage capacity of a line memory among image data output on a line-by-line basis from an imaging device, to the line memory;
reading the first image region data from the line memory in which the first image region data is stored;
writing second image region data besides the first image region data among image data output on a line-by-line basis from the imaging device, to a storage medium;
reading the second image region data from the storage medium in which the second image region data is stored, after the output of image data from the imaging device is complete; and
writing the second image region data read from the storage medium to the line memory.

14. The storage medium of claim 13, wherein the method further comprises:
performing an image signal process with respect to the first image region data read from the line memory after the step of reading the first image region data;
reading the second image region data from the line memory in which the second image region data is stored after the step of writing the second image region data to the line memory; and
performing the image signal process with respect to=the second image region data read from the line memory after reading the second image region data from the line memory.

15. The storage medium of claim 14, wherein:
the image signal process includes interpolating the first image region data or the second image region data.

16. The storage medium of claim 13, wherein the method further comprises:
after the step of reading the first image region data, interpolating the first image region data, processing the interpolated first image region data, and storing the processed first image region data in a memory.

17. The storage medium of claim 13, wherein the method further comprises:
after the step of writing the second image region data to the line memory, reading the second image region data from the line memory, interpolating the second image region data, processing the interpolated second image region data, and storing the processed second image region data in a memory.

18. The storage medium of claim 13, wherein:
the first image region data is transmitted from an imaging device signal processing unit and the second image region data is transmitted through a bus interface.

* * * * *